3,169,133
3α-FLUOROANDROSTANES AND
15β-FLUOROGESTERONE
Donald E. Ayer, Portage Township, Kalamazoo County, Mich., assignor to The Upjohn Company, Kalamazoo, Mich., a corporation of Delaware
No Drawing. Filed July 2, 1962, Ser. No. 207,050
4 Claims. (Cl. 260—397.3)

This application is a continuation-in-part of application Serial No. 143,556, filed October 9, 1961, now U.S. Patent No. 3,056,807.

This invention relates to a novel process for the preparation of fluorosteroids.

A number of processes for the preparation of fluorosteroids have been described previously. Illustratively, fluorosteroids have been prepared by the action of hydrogen fluoride, or a reagent capable of generating hydrogen fluoride, on the appropriate epoxysteroid. For example, the action of hydrogen fluoride on a 9,11-epoxysteroid yields the corresponding 9-fluoro-11-hydroxysteroid; see, for example, U.S. Patent 2,660,586. Fluorosteroids have also been prepared by the action of perchloryl fluoride on the 3-enol ethers or esters of 3-keto-Δ⁴-steroids which are thereby converted to the corresponding 6-fluoro-3-keto-Δ⁴-steroids; see, for example, Belgian Patent 589,721. Fluorosteroids have also been prepared from the corresponding hydroxysteroids by esterifying the latter with an organic sulfonic acid such as methane sulfonic acid and reacting the sulfonate ester so obtained with a fluorinating agent such as silver fluoride. The preparation of 9-fluoro-11-deoxysteroids by the action of a hydrogen fluoride-pyridine complex on the corresponding 11β-hydroxysteroids has been effected; see, for example, German Patent 1,081,888.

However, no method of fluorination of steroids has been described previously in which a fluorine atom has been introduced into the steroid molecule by direct replacement of a hydroxyl group therein, said fluorine atom being introduced at the original site of the hydroxyl group. Such a method is described for the first time in the present specification.

The advantages of this method are readily apparent. Thus, using the process of this invention, fluorosteroids can be prepared directly from readily available starting materials and the preparation of complex and not readily accessible starting materials, e.g., epoxides and enol derivatives of unsaturated ketones, is avoided. The advantages of the process over the indirect sulfonate ester route will be obvious to those skilled in the art. Other advantages inherent in the method of carrying out the novel process of the invention will become apparent as the description of the process proceeds.

The novel process of the present invention comprises reacting an hydroxysteroid selected from the class consisting of primary and secondary alcohols of the pregnane and androstane series, with a fluorinating agent having the formula:

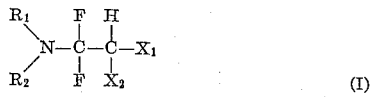

wherein $X_1$ is selected from the class consisting of chlorine and fluorine, $X_2$ is selected from the class consisting of chlorine, fluorine, and trifluoromethyl, $R_1$ and $R_2$ taken individually represent lower-alkyl, and $R_1$ and $R_2$ taken together with the attached nitrogen atom represent the residue of a heterocyclic radical containing from 5 to 7 ring atoms, inclusive, in an inert organic solvent, whereby the hydroxyl group in the hydroxysteroid starting material is replaced by fluorine.

The term "lower-alkyl" means an alkyl radical containing from 1 to 8 carbon atoms, inclusive, such as methyl, ethyl, propyl, butyl, amyl, hexyl, heptyl, octyl, and isomeric forms thereof. The term "heterocyclic radical containing from 5 to 7 ring atoms, inclusive" is inclusive of pyrrolidino, 2-methylpyrrolidino, 2,2-dimethylpyrrolidino, and like alkylpyrrolidino groups, 4-methylpiperazino, 2,4-dimethylpiperazino, and like alkylpiperazino groups, morpholino, piperidino, 2-methylpiperidino, 3-methylpiperidino, and like alkylpiperidino groups, hexamethyleneimino, homomorpholino, and the like.

Examples of fluorinating agents having the Formula I are N-(2-chloro-1,1,2-trifluoroethyl)diethylamine, N-(1,1,2,2-tetrafluoroethyl)diethylamine, N-(2-chloro-1,1,2-trifluoroethyl)-dimethylamine, N-(2-chloro-1,1,2-trifluoroethyl)dipropylamine, N-(2-chloro-1,1,2-trifluoroethyl)diisobutylamine, N-(2-chloro-1,1,2-trifluoroethyl)dioctylamine, N-(2-chloro-1,1,2-trifluoroethyl)methylethylamine, N-(2,2-dichloro-1,1-difluoroethyl)diethylamine, N-(1,1,2,3,3,3-hexafluoropropyl)diethylamine, N-(1,1,2,2-tetrafluoroethyl)diisopropylamine, and the like. The preferred fluorinating agent for use in the process of the invention is N-(2-chloro-1,1,2-trifluoroethyl)diethylamine.

The term "inert organic solvent" means any organic solvent which does not react with the fluorinating agent and in which the steroid starting material is appreciably soluble such as aromatic and aliphatic hydrocarbons, halogenated hydrocarbons, esters, ketones, ethers and tertiary alcohols. Examples of such solvents are benzene, toluene, chlorobenzene, pentane, hexane, cyclohexane, ethyl acetate, butyl acetate, acetone, methyl ethyl ketone, tetrahydrofuran, ethyl ether, t-butyl alcohol, t-amyl alcohol, and the like. Advantageously the inert organic solvent employed in the process of the invention is a halogenated aliphatic hydrocarbon such as methylene chloride, chloroform, carbon tetrachloride, ethylene dichloride, ethylidene chloride, propylene chloride, trimethylene chloride, and the like. The solvent which is particularly preferred is methylene chloride.

Advantageously, but not necessarily, the process of the invention is carried out in the presence of an acid catalyst. The acid catalysts which are employed for this purpose are proton-forming acids such as the hydrogen halides, phosphoric acid, sulfuric acid, and the like or Lewis acids (see Fieser and Fieser, "Organic Chemistry," Third Edition, page 138, Rheinhold, 1956) such as boron trifluoride, boron trichloride, aluminum trifluoride, arsenic trifluoride, phosphorus pentafluoride, titanium tetrafluoride, and the like. The preferred acids are the hydrogen halides, particularly hydrogen fluoride. In the case of hydrogen fluoride, the acid can be added to the reaction mixture or can be generated in situ in the manner described hereinafter.

The process of the invention is carried out conveniently by bringing together the hydroxysteroid starting material, the fluorinating agent, and, if desired, the acid catalyst, in the presence of the inert organic solvent. The temperature at which the reaction is carried out in order to obtain optimum yields of the desired fluorosteroid varies according to the nature of the steroid starting material. In the case of starting steroids wherein the hydroxy group is primary, i.e., is attached to a carbon atom which also carries two hydrogen atoms, the maximum yields of the desired fluorosteroid are obtained when the reaction is carried out at temperatures within the range of about 25° C. up to the boiling point of the reaction mixture which varies according to the solvent employed. However, the reaction can be conducted at temperatures lower than 25° C. but at such temperatures the desired fluorosteroid may be contaminated with substantial amounts of the chlorofluoroacetate of the hydroxysteroid starting material.

In the case of starting hydroxysteroids in which the hydroxy group is secondary, i.e., is attached to a carbon atom which carried only one hydrogen atom, the effect of temperature on the composition of the reaction product is of much less importance. Thus, with this type of hydroxysteroid the desired fluorosteroid is obtained in substantial yield using reaction temperatures from about 0° C. up to the boiling point of the reaction mixture. The by-products of the reaction, namely, the chlorofluoroacetate of the starting hydroxysteroid and the dehydrosteroid produced by dehydration of the starting hydroxysteroid are in general formed in proportions relatively independent of temperature.

In all cases, the desired fluorosteroid can be isolated from the reaction mixture and separated from the aforementioned by-products by conventional procedures, for example, by solvent extraction of the reaction product followed by removal of the solvent and recrystallization and/or chromatography of the resulting product.

The time for which the process of the invention is carried out varies according to the reaction temperature employed. Generally speaking the reaction time is of the order of 1 hr. to 18 hours at reaction temperatures of 0° C. to about 25° C. but can be reduced at higher temperatures.

Advantageously the fluorinating agent having the Formula I is employed in excess of the stoichiometric quantity based on the starting hydroxysteroid. Preferably the fluorinating agent is present in an excess of the order of about 1.1 to 10 moles per mole of starting monohydroxysteroid.

When the acid catalyst employed in the process of the invention is hydrogen fluoride, the latter can be added to the reaction mixture as such or can be generated in situ, for example, by addition of the requisite quantity of water or an aliphatic alcohol such as methanol, ethanol, and the like to produce the desired quantity of hydrogen fluoride by reaction with the fluorinating agent as follows:

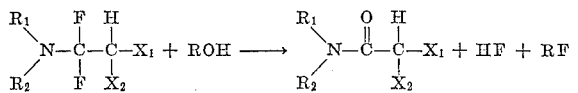

wherein R represents hydrogen, methyl, ethyl and other lower alkyl.

In general the acid is present initially in the reaction mixture in catalytic quantities only, i.e., of the order of about 0.1 to about 25 percent of the starting hydroxysteroid on a mole-equivalent basis. In many instances the yield of fluorosteroid obtained in the process of the invention can be increased significantly by the incorporation in the reaction mixture of a tertiary amine hydrofluoride. Tertiary amine hydrofluorides which can be employed for this purpose are those having the formula

wherein $R_3$, $R_4$ and $R_5$ are selected from the class consisting of lower-alkyl, as hereinbefore defined, and aralkyl from 7 to 13 carbon atoms, inclusive, and $R_3$ and $R_4$ taken together with N represent a heterocyclic radical containing from 5 to 7 ring atoms, inclusive, as hereinbefore defined.

The term "aralkyl" means an aralkyl group containing from 7 to 13 carbon atoms, inclusive, such as benzyl, phenethyl, phenylpropyl, benzhydryl, and the like.

Examples of tertiary amine by hydrofluorides having the formula $R_3R_4R_5N.HF$ are the hydrofluorides of trimethylamine, triethylamine, tripropylamine, tributylamine, triisobutylamine, trioctylamine, diethylbenzylamine, methyldiethylamine, propyldimethylamine, N-methylpyrrolidine, N,2,2-trimethylpyrrolidine, N-methylpiperidine, N,2 - dimethylpiperidine, N,N'-dimethylpiperazine, N,N'-diethylpiperazine, N-methylmorpholine, N-ethylmorpholine, and the like.

Advantageously, the tertiary amine hydrofluorides, when employed in the process of the invention, are present in a proportion within the range of about 1 mole to about 20 moles per mole of the monohydroxysteroid starting material.

The beneficial effect of the presence of a tertiary amine hydrofluoride in the process of the invention is evident from the following illustration. When 15α-hydroxypregn - 4 - ene - 3,11,20 - trione is fluorinated using N-(2-chloro-1,1,2 - trifluoroethyl)diethylamine as fluorinating agent according to the process of the invention there is obtained 15β-fluoropregn-4-ene-3,11,20-trione in a yield of approximately 43%. When the reaction is repeated in the presence of triethylamine hydrofluoride the yield of the desired product is increased to approximately 63%.

The process of the invention is applicable broadly to the fluorination (by direct replacement of hydroxy) of primary and secondary steroid alcohols of the pregnane and androstane series. Said steroid alcohols may, in addition to the hydroxy groups, contain substituents or combinations of substituents such as halo, alkyl, alkoxy, haloalkyl, keto, acyloxy, and the like, which are substantially inert under the conditions of the process of the invention.

The primary and secondary alcohols of the pregnane and androstane series are a well-recognized group of steroid alcohols. This group is inclusive of the cortisone series, i.e., cortisone, hydrocortisone, prednisone, prednisolone, and the known 2-alkyl, 6-alkyl, 16-alkyl, 6,16-dialkyl, 6-halo, 9-halo, 6,9-dihalo, 6-halo-16-alkyl, 6,9-dihalo-16-alkyl, 6-hydroxymethyl, 16-hydroxymethyl, 6-halomethyl, 16-halomethyl, 16-hydroxy, and like known derivatives; the progesterone series, i.e., 11-hydroxy, 14-hydroxy, 15-hydroxy, 16-hydroxy, and like known hydroxy progesterones and the 2-alkyl, 6-alkyl, 6-halo, 6,9-dihalo and like known derivatives thereof; the testosterone series, i.e., testosterone and the known 6-alkyl, 7-alkyl, 2-halo, 6-halo, and like derivative thereof including the corresponding 19-nortestosterones; and the androstane series, i.e., the androstanediols, androstenediols, androstanolones, androstenolones and like known derivatives of androsterone.

Representative primary and secondary alcohols of the pregnane and androstane series are: 6α-hydroxyprogesterone, 11α-hydroxyprogesterone, 11β-hydroxyprogesterone, 11α-hydroxy-17-methyltestosterone, 16α - hydroxytestosterone, 19-hydroxyandrost-4-ene-3,17 - dione, estradiol, 5α-androstane-3α,16α-diol, 5α-androstane - 3α,16β-diol, 5α-androstan-3β-ol-11,17-dione, 5α-androstan - 17α-ol-3-one, 5α-androstan-17β-ol-3-one, Δ⁵-androsten-3β-ol-17-one, 17-methyl-Δ⁵-androstene-3β,17β-diol, 5α-pregnan-3β-ol-11,20-dione, 5β-pregnan-20α-ol-3,11-dione, 5α-pregnan-3α-ol-20-one, 5β-pregnan-3α-ol-20-one, 5α-pregnane-3β,11β,21-triol-20-one, 5α-pregnane-3α,20α-diol, 5β-pregnane-3α,20α-diol, Δ⁵-pregnen-3β-ol-20-one, 15α-hydroxypregn-4-ene-3,11,20-trione, 6β,11α-dihydroxyprogesterone, 11β,16α,21-trihydroxy-pregna-1,4,17(20) - trien - 3 - one and the 21-acylates thereof, 9α-fluoro-11β,16α,17α,21-tetrahydroxy-1,4-pregnadiene-3,20-dione 21 - acetate, 7α-hydroxyestrone, 7β-hydroxyestrone, 2β-hydroxytestosterone, 6α-methyl-16α-hydroxyhydrocortisone, 6α-fluoro-16α-hydroxyhydrocortisone, 16β-hydroxymethyl-17-isoprogesterone, 6α-hydroxymethyl-17α-hydroxy-5α-pregnane-3,20-dione, 18-hydroxyprogesterone, 18 - hydroxytestosterone 17-acetate, 19-hydroxycortexone, 6β-hydroxy-17-methyltestosterone, cholesterol, ergosterol, stigmasterol, diosgenin, methyl 3α-carbethoxy-12α-hydroxycholanate, and the like.

It has been found that, using the process of the invention, hydroxy groups in certain positions of the steroid molecule react less readily than those in other positions. For example, an 11-hydroxy group generally reacts less readily than hydroxy groups in other positions. Thus it is possible, in certain instances where there are two or more hydroxy groups present in the molecule of the steroid starting material, to replace one of the hydroxyl groups with fluorine without replacing the other group. Further, it is also possible, in the case where two or more hydroxyl groups are present in the starting steroid, to replace one hydroxyl group by fluorine while the other hydroxyl group undergoes one of the side reactions of the process, namely dehydration or conversion to the chlorofluoro-acetate. For example, 6β,11α-dihydroxypregn-4-ene-3,20-dione when subjected to the process of the invention, undergoes replacement of the 6-hydroxy group by fluorine and simultaneous removal of the 11-hydroxy group by dehydration to form 6α-fluoropregna-4,9(11)-diene-3,20-dione as the principal product.

The replacement of an hydroxyl group by fluorine according to the process of the invention can also be accompanied by rearrangement. For example, 6β-hydroxy-3:5-cyclopregnane-20-one is converted by the process of the invention to 3β-fluoropregn-5-en-20-one. Similarly, treatment of either 11β,16α,21-trihydroxy-pregna-1,4,17(20)-triene-3-one 21-acetate or 11β,20,21-trihydroxypregna-1,4,16-trien-3-one 21-acetate by the process of the invention yields in each case a mixture of the 16α- and 16β-epimers of 11β,21-dihydroxy-16-fluoropregna-1,4,17(20)-trien-3-one 21-acetate and the 20α- and β-epimers of 11β,21-dihydroxy-20-fluoro-pregna-1,4,16-triene-3-one, 21-acetate.

Where the hydroxy group in the starting steroid is in a stereospecific configuration (i.e., a secondary alcohol) it is found generally that inversion accompanies replacement of the hydroxy group by fluorine in the process of the invention. For example, where a nuclear hydroxy group in a starting steroid is in the α-position the fluoro group in the resulting fluoro steroid will generally be in the β-position. However, where the hydroxy group in the starting steroid is attached to a carbon atom which forms part of an allylic or homoallylic system the process of the invention can yield fluorosteroids of the inverted or the same configuration as well as rearranged products.

It is believed that the process of the invention takes place according to the following reaction mechanisms:

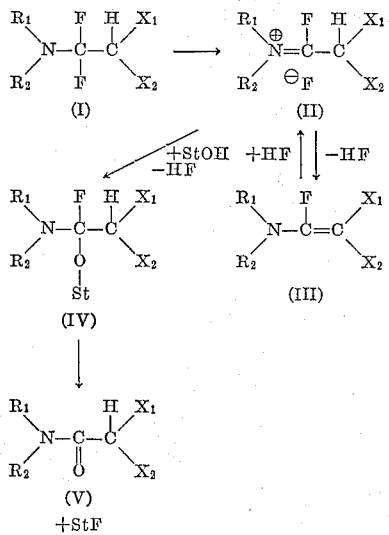

In the above postulated reaction mechanism the fluorinating agent (I) is first converted to the iminium salt form (II), which latter can also be converted to and derived from (III), i.e., the vinyl analogue of (I). The iminium salt (II) reacts with the hydroxysteroid StOH, where St represents the residue of a steroid molecule, to form the intermediate (IV) which subsequently yields the fluorosteroid StF and the amide (V).

It is to be understood that above mechanism is offered by way of explanation only and in no way affects the scope of the present invention.

The fluorinating agents having the Formula I which are employed in the process of the invention can be prepared by reaction of trifluorochloroethylene (where $X_1=Cl$ and $X_2=F$) or tetrafluoroethylene (where $X_1=X_2=F$) or 2,2-dichloro-1,1-difluoroethylene (where $X_1=X_2=Cl$) or perfluoropropene (where $X_1=F$; $X_2=CF_3$) with the appropriate amine $R_1R_2NH$, where $R_1$ and $R_2$ have the significance hereinbefore defined. The reaction is preferably carried out within the temperature range 0° C. to 50° C. in a sealed vessel. Advantageously an inert organic solvent such as methylene chloride, dioxane, ether and the like, can be employed in the reaction to moderate the exothermic nature of the latter. The desired product is separated from the reaction mixture by conventional procedures, for example, by distillation under reduced pressure and is protected from exposure to the atmosphere before being used in the process of the invention.

The process of the invention, as indicated above, is of general applicability and can be employed to replace with fluorine a hydroxy group or groups in primary and secondary alcohols of the pregnane and androstane series. Thus the process of the invention can be employed in the preparation in high yields of known fluorosteroids which have been available hitherto only by circuitous routes which in many instances gave low yields. For example, the process of the invention can be employed in the fluorination of 6β-hydroxy-11α-hydroxyprogesterone whereby replacement of the 6-hydroxy and dehydration occur simultaneously to yield the known compound, 6α-fluoro-9(11)-dehydroprogesterone. The latter compound is a valuable intermediate and can be used, for example, as described in U.S. Patent 2,838,501 in the preparation of 6α,9α-difluoro-11β-hydroxyprogesterone which is active as a progestational agent. The process of the invention can also be employed to prepare 11β,21-dihydroxy-16α(or β)-fluoropregna-1,4,17(20)-triene-3-one 21-acetate by fluorination of 11β,16α,21-trihydroxypregna-1,4,-17(20)-triene-3-one 21-acetate. The compounds 11β,21-dihydroxy-16α(or β)-fluoropregna-1,4,17(20)-triene-3-one 21-acetate so obtained are valuable intermediates in that they can be subjected to oxidative hydroxylation, for example, using osmium tetroxide and an oxidizing agent such as hydrogen peroxide or N-methylmorpholine oxide peroxide to yield 16α(or β)-fluoroprednisolone 21-acetate which compounds exhibit anti-inflammatory and glucocorticoid activity when administered orally or parenterally to mammals, including valuable domestic animals.

As further illustration of the usefulness of the process of the invention, the compound 3β-hydroxy-androst-5-en-17-one is converted thereby in substantially quantitative yield to the compound 3β-fluoro-androst-5-en-17-one previously obtained by Shoppee and Summers, J. Chem. Soc., 4813 (1957), using a different route in only 68% yield. Similarly, using the process of the invention, 6β-hydroxy-3:5-cyclopregnane-20-one is converted in almost quantitative yield to 3β-fluoro-pregn-5-en-20-one previously obtained by Jacobsen and Jensen, in only 45% yield using a different route. Chemistry and Industry, 172 (1957).

Using the process of the invention, 3β-hydroxy-5α-androstan-17-one is converted in high yield to 3α-fluoro-5α-androstan-17-one. The latter compound is active as an anabolic, androgenic, antifertility and cholesterol-lowering agent and is also useful as an intermediate, by treatment with a methyl Grignard agent using procedures known in the art, in the preparation of 3α-fluoro-17α-methyl-5α-androstan-17β-ol and 17-acylates thereof, which compounds are active as anabolic agents when administered orally or parenterally to mammals, including valuable domestic animals.

In further illustration of the usefulness of the process of the invention the compound 15α-hydroxy-11-ketoprogesterone can be converted in high yield to 15β-fluoro-11-ketoprogesterone which compound is a valuable intermediate in the preparation of 15β-fluorocortisone, 15β-fluorohydrocortisone, 15β-fluoroprednisone, 15β-fluoroprednisolone and the 9α-fluoro analogues thereof as well as the 21-acylates of these compounds. These compounds are highly active anti-inflammatory agents having higher anti-inflammatory activity and much lower sodium-retaining properties than the corresponding compounds which lack the 15β-fluoro group. The conversion of 15β-fluoro-11-ketoprogesterone to 15β-fluorocortisone, and 15β-fluorohydrocortisone and 21-acylates thereof is carried out in the same manner as 11-ketoprogesterone is converted to cortisone and hydrocortisone and the 21-acylates thereof, for example, in the manner described in U.S. 2,790,814, 2,781,343, 2,769,825, and 2,769,823. The 15β-fluorocortisone and 15β-fluorohydrocortisone and 21-acylates thereof so obtained can be converted to the Δ¹-analogues thereof by 1-dehydrogenation. The 1-dehydrogenation can be effected microbiologically using a 1-dehydrogenating microorganism, for example, of the genus Septomyxa employing, for example, the procedure described in U.S. Patent 2,897,218, or can be effected chemically, for example, by treatment with selenium dioxide using procedures known in the art, for example, that described by Meystre et al., Helv. Chim. Acta 39, 734 (1956).

Similarly, 6α-methyl-15α-hydroxy-11-ketoprogesterone can be converted by the process of the invention to 6α-methyl-15β-fluoro-11-ketoprogesterone in high yield. The compound so obtained is a valuable intermediate, using the procedures described above, in the preparation of 6α-methyl-15β-fluorocortisone, 6α-methyl-15β-fluorohydrocortisone, 6α-methyl-15β-fluoroprednisone, and 6α-methyl-15β-fluoroprednisolone and the 9α-fluoro analogues as well as the 21-acylates of these compounds, which compounds are highly active anti-inflammatory agents which can be administered to mammals, including valuable domestic animals.

It will be appreciated that the above examples of the manner in which the process of the invention can be employed have been given for purposes of illustration only and many other applications of the process could be given, which applications will be obvious to one skilled in the art. The process of the invention is of such general applicability to the preparation of fluorosteroids that enumeration of further specific examples of its application is unnecessary.

The novel compounds produced by the process of the invention, when employed in therapy, can be prepared and administered to mammals, birds, and animals, in a wide variety of oral or parenteral dosage forms, singly or in admixture with other coacting compounds. They can be administered with a pharmaceutical carrier which can be a solid material or a liquid in which the compound is dissolved, dispersed, or suspended. The solid compositions can take the form of tablets, powders, capsules, pills or the like, preferably in unit dosage forms for simple administration or precise dosages. The liquid compositions can take the form of solutions, emulsions, suspensions, syrups, or elixirs.

The following preparations and examples are illustrative of the process and products of this invention but are not to be construed as limiting.

PREPARATION 1

*N-(2-chloro-1,1,2-trifluoroethyl)diethylamine*

A total of 15 ml. of trifluorochloroethylene was condensed in a pressure tube cooled in an acetone-Dry Ice (solid carbon dioxide) bath. To the pressure tube was added 10.3 ml. of diethylamine previously cooled to −40° C. and the tube was then sealed, placed in an ice bath and allowed to warm slowly to room temperature. The tube and contents were then allowed to stand for 48 hrs. at room temperature before cooling the tube, opening the latter and distilling the contents under reduced pressure with minimum exposure to atmospheric moisture. There was thus obtained 15.7 g. (85% yield) of N-(2-chloro-1,1,2-trifluoroethyl)diethylamine in the form of a liquid having a boiling point of 33 to 34° C. at a pressure of 6 mm. of mercury.

Using the above procedure, but replacing diethylamine by dimethylamine, diisopropylamine, dibutylamine, pyrrolidine, 2-methylpyrrolidine, 2,2-dimethylpyrrolidine, 4-methylpiperazine, morpholine, piperidine, or 2-methylpiperidine, there are obtained N-(2-chloro-1,1,2-trifluoroethyl)dimethylamine, N-(2-chloro-1,1,2-trifluoroethyl)diisopropylamine, N-(2-chloro-1,1,2-trifluoroethyl)dibutylamine, N-(2-chloro-1,1,2-trifluoroethyl)pyrrolidine, N-(2-chloro-1,1,2-trifluoroethyl)-2'-methylpyrrolidine, N-(2-chloro-1,1,2-trifluoroethyl)-2',2'-dimethylpyrrolidine, 1(2-chloro-1,1,2-trifluoroethyl)-4'-methylpiperazine, N-(2-chloro-1,1,2-trifluoroethyl)-morpholine, N-(2-chloro-1,1,2-trifluoroethyl)piperidine, and N-(2-chloro-1,1,2-trifluoroethyl)-2'-methylpiperidine, respectively.

Similarly, using the procedure of Preparation 1, but replacing trifluorochloroethylene by 2,2-dichloro-1,1-difluoroethylene there is obtained N-(2,2-dichloro-1,1-difluoroethyl)-diethylamine.

Similarly, using the procedure of Preparation 1, but replacing trifluorochloroethylene by perfluoropropene there is obtained N-(1,1,2,3,3,3-hexafluoropropyl)-diethylamine.

EXAMPLE 1

*15β-fluoropregn-4-ene-3,11,20-trione*

A solution of 10 g. (0.029 mole) of 15α-hydroxypregn-4-ene-3,11,20-trione in 300 ml. of methylene chloride was cooled to 5° C. with exclusion of moisture and 9 ml. (10.7 g.; 0.0564 mole) of N-(2-chloro-1,1,2-trifluoroethyl)-diethylamine was added. The resulting mixture was allowed to stand for 4.5 hrs. at 5° C. before adding ice water. The organic layer was separated, washed successively with water, aqueous sodium bicarbonate solution, and water before being dried over anhydrous magnesium sulfate. The dried solution was filtered and the filtrate was distilled initially at atmospheric pressure to remove solvent and finally at 90° C. under a pressure of 1 mm. of mercury to remove N,N-diethylchlorofluoroacetamide. The oily distillation residue was dissolved in methylene chloride and chromatographed on a column of magnesium silicate (Florisil). The column was eluted with 7 l. of hexanes (Skellysolve B) containing 12.5% by volume of acetone. The first 4 l. of eluate was evaporated to dryness to yield 1.98 g. of pregna-4,14-diene-3,11,20-trione in the form of a crystalline solid having a melting point of 191 to 193° C. The following 3 l. of eluate was evaporated to give 1.59 g. of a mixture containing 2 parts of 15β-fluoropregn-4-ene-3,11,20-trione, 1 part of pregna-4,14-diene-3,11,20-trione, and 1 part of the 15-chloro-fluoroacetate of 15α-hydroxypregn-4-ene-3,11,20-trione. The column was then eluted with Skellysolve B containing increased proportions of acetone up to 30% by volume. The next 4.5 l. of eluate were evaporated to obtain 3.74 g. of a white solid which on crystallization from acetone-Skellysolve B mixture gave 2.28 g. of 15β-fluoropregn-4-ene-3,11,20-trione in the form of a crystalline solid having a melting point of 157 to 159° C. Later fractions of eluate yielded a further 1.7 g. of impure 15β-fluoropregn-4-ene-3,11,20-trione which was combined with the earlier impure fraction and rechromatographed under similar solvent conditions to obtain an additional 1.9 g. of product (total yield of 15β-fluoropregn-4-ene-3,11,20-trione=42%). An analytical sample of 15β-fluoropregn-4-ene-3,11,20-trione having a melting point of 159 to 161° C. was obtained by recrystallization from a mixture of acetone and Skellysolve B. The ultraviolet spectrum of this compound (in ethanol) exhibited a maximum at 237.5 millimicrons (ε=14,300).

*Analysis.*—Calcd. for $C_{21}H_{27}O_3F$: C, 72.80; H, 7.86; F, 5.48. Found: C. 73.42; H, 7.64; F, 5.20.

A pure sample of 15α-hydroxypregn-4-ene-3,11,20-trione 15-chlorofluoroacetate having a melting point of 182 to 183° C. was isolated from the impure mixture obtained as described above by fractional crystallization from aqueous methanol and from a mixture of acetone and Skellysolve B. The ultraviolet spectrum of this compound (in ethanol) exhibited a maximum at 237.5 millimicrons ($\epsilon=15{,}590$). The infrared spectrum of the compound (Nujol mull) exhibited maxima at 1765, 1750, 1705, 1665, 1615, 1287, 1273, and 1213 reciprocal centimeters.

*Analysis.*—Calcd. for $C_{23}H_{28}O_5FCl$: C, 62.94; H, 6.43; F, 4.33; Cl, 8.08. Found: C, 62.90; H, 6.48; F, 4.42; Cl, 8.12.

EXAMPLE 2

*6α-fluoropregna-4,9(11)-diene-3,20-dione*

A total of 0.7 g. (0.002 mole) of 6β,11α-dihydroxypregn-4-ene-3,20-dione in a Soxhlet thimble was extracted into a refluxing solution of 2 ml. (0.0125 mole) of N-(2-chloro-1,1,2-trifluoroethyl)diethylamine in 125 ml. of methylene chloride over an 18 hr. period. The resulting solution was cooled, water was added, and the organic layer was separated and washed with aqueous sodium bicarbonate solution and then with water. The washed solution was evaporated on a steam bath in a stream of air. The residue (0.83 g.) was dissolved in methylene chloride and chromatographed on a column of 100 g. of magnesium silicate (Florisil). The column was eluted with Skellysolve B containing 10% by volume of acetone. The first 850 ml. of eluate yielded an oil which was discarded. The next 500 ml. of eluate was evaporated and the residue was crystallized from a mixture of Skellysolve B and acetone and then from acetone. There was thus obtained 6α-fluoropregna-4,9(11)-diene-3,20-dione in the form of a crystalline solid having a melting point of 201 to 203° C.

*Analysis.*—Calcd. for $C_{21}H_{27}FO_2$: F, 5.75. Found: F, 5.69.

The above experiment was carried out at a lower temperature (5° C.) using the following procedure:

A suspension of 0.69 g. of 6β,11α-dihydroxypregn-4-ene-3,20-dione in 80 ml. of methylene chloride was cooled to 5° C. and 0.9 ml. of N-(2-chloro-1,1,2-trifluoroethyl)diethylamine was added. The mixture was stirred at ice-bath temperature until all the solid dissolved and was then allowed to stand for 3 hrs. at 5° C. Water was added to the mixture and the organic layer was separated and washed with aqueous sodium bicarbonate solution and then with water before being dried over anhydrous magnesium sulfate. The dried solution was filtered and the filtrate was evaporated to dryness. The residue was shown by paper chromatographic analysis to contain approximately 11% of 6α-fluoropregna-4,9(11)-diene-3,20-dione, 22% pregna-4,6,9(11)-triene-3,20-dione, 31% of 6β-hydroxypregna-4,9(11)-diene-3,20-dione 6-chlorofluoroacetate, and 36% of 6β-hydroxypregna-4,9,(11)-diene-3,20-dione. This mixture was subjected to chromatography on a column of Florisil as described previously to obtain pure 6α-fluoropregna-4,9(11)diene-3,20-dione.

EXAMPLE 3

*3β-fluoroandrost-5-en-17-one*

A solution of 1.15 g. (0.004 mole) of 3β-hydroxyandrost-5-en-17-one in 60 ml. of ethylene dichloride was cooled in an ice-bath and 1.25 ml. (0.0078 mole) of N-(2-chloro-1,1,2-trifluoroethyl)diethylamine was added. The solution was allowed to stand for 16 hrs. at 5° C. before adding water. The organic layer was separated, washed with aqueous sodium bicarbonate solution and then with water before being dried over anhydrous magnesium sulfate. The dried solution was filtered and the filtrate was evaporated to dryness. The residue was dissolved in methylene chloride and chromatographed on a column of magnesium silicate (Florisil). The column was eluted with hexanes (Skellysolve B) containing 1% of acetone and the eluate was evaporated to give 1.09 g. of material having a melting point of 144 to 153° C. This material was recrystallized from aqueous acetone. There was thus obtained 0.895 g. of 3β-fluoroandrost-5-en-17-one having a melting point of 152–154° C undepressed on admixture with an authentic sample of the compound.

EXAMPLE 4

*3α-fluoro-5α-androstan-17-one*

A solution of 1.74 g. (0.006 mole) of 3β-hydroxy-5α-androstan-17-one in 30 ml. of methylene chloride was cooled in an ice bath and 1.6 ml. (0.01 mole) of N-(2-chloro-1,1,2-trifluoroethyl)diethylamine was added. The mixture was allowed to stand for 18 hrs. at 5° C. before adding water. The organic layer was separated, washed with aqueous sodium bicarbonate solution and then with water before being dried over magnesium sulfate. The dried solution was filtered and the filtrate was evaporated to dryness. The residue was dissolved in methylene chloride and chromatographed on a column of 50 g. of magnesium silicate (Florisil). The column was eluted with hexanes (Skellysolve B) containing 1% of acetone and the eluate (1.6 l.) was evaporated to yield 1.77 g. of a mixture of 3α-fluoro-5α-androstan-17-one and 5α-androst-2-en-17-one. The desired 3α-fluoro-5α-androstan-17-one was separated from this mixture as follows:

The mixture was dissolved in 10 ml. of methylene chloride, diluted with 40 ml. of methanol and cooled in an ice-bath while ozone was bubbled in rapidly for 10 minutes. The resulting solution was purged with nitrogen, diluted with 20 ml. of N hydrochloric acid and heated to the boiling point. The solution was then cooled, concentrated to a small volume in vacuo. The residue was extracted with methylene chloride and the methylene chloride extract was washed successively with water, aqueous sodium bicarbonate, and water, before being dried over anhydrous magnesium sulfate. The dried solution was filtered and the filtrate was evaporated to dryness. The residue (1.46 g.) was dissolved in methylene chloride and chromatographed on a column of magnesium silicate (Florisil). The column was eluted with 1.6 liter of Skellysolve B containing 1% of acetone and the eluate was evaporated to dryness. The residue (0.875 g.) was crystallized from aqueous acetone. There was thus obtained 0.64 g. of 3α-fluoro-5α-androstan-17-one having a melting point of 114 to 116° C. An analytical sample having a melting point of 119 to 120° C. and $[\alpha]_D +80°$ (chloroform) was obtained by further recrystallization from aqueous methanol and methanol. The infrared spectrum of the compound (Nujol mull) exhibited maxima at 1743, 1735, 1055, 1013, and 993 reciprocal centimeters.

*Analysis.*—Calcd. for $C_{19}H_{29}FO$: C, 78.04; H, 10.00; F, 6.50. Found: C, 77.83; H, 9.88; F, 6.47.

The 3α-fluoro-5α-androstan-17-one so obtained exhibits pharmacological activity and is useful as an anabolic-androgenic agent, a cholesterol-lowering agent, an antifertility agent and a central nervous system depressant.

EXAMPLE 5

*3β-fluoro-5α-androstan-17-one*

A solution of 4.35 g. (0.015 mole) of 3α-hydroxy-5α-androstan-17-one in 75 ml. of methylene chloride was cooled in an ice-bath and 4 ml. (0.025 mole) of N-(2-chloro-1,1,2-trifluoroethyl)diethylamine was added. The mixture was allowed to stand for 18 hrs. at 5° C. before adding water. The organic layer was separated, washed with aqueous sodium bicarbonate solution and then with water before being dried over anhydrous magnesium sulfate. The dried solution was filtered and the filtrate was evaporated to dryness. The residue was dissolved in methylene chloride and chromatographed on a column of 100 g. of magnesium silicate (Florisil). The column was eluted with 3 l. of Skellysolve B containing 1% by volume of acetone and the eluate was evaporated to dryness to give 5.1 g. of crude material from which the desired 3β-fluoro-5α-androstan-17-one was isolated as follows:

The crude material obtained as described above was dissolved in 20 ml. of methylene chloride, diluted with 80 ml. of methanol and cooled in an ice bath while ozone was bubbled in rapidly for 25 minutes. The resulting solution was purged with nitrogen, diluted with 50 ml. of N hydrochloric acid and heated to the boiling point. The solution was then cooled and concentrated to a small volume in vacuo. The residue was extracted with methylene chloride and the methylene chloride extract was washed successively with water, aqueous sodium bicarbonate, and water, before being dried over anhydrous magnesium sulfate. The dried solution was filtered and the filtrate was evaporated to dryness. The residue was dissolved in methylene chloride and chromatographed on a column of 100 g. of magnesium silicate (Florisil) and the column was eluted with Skellysolve B containing 1% by volume of acetone. The first 3 l. of eluate was evaporated on a steam bath overnight in a stream of nitrogen to remove residual N,N-diethylchlorofluoroacetamide. The residue (1.2 g.) was crystallized from aqueous acetone. There was thus obtained 0.7 g. of 3β-fluoro-5α-androstan-17-one in the form of a crystalline solid having a melting point of 129–131° C. Two further recrystallizations from methanol raised the melting point to 132–134° C. undepressed by admixture with an authentic sample of the compound.

EXAMPLE 6

*3β-fluoropregn-5-en-20-one*

A solution of 0.95 g. (0.003 mole) of 6β-hydroxy-3:5-cyclopregnan-20-one in 20 ml. of methylene chloride was cooled in an ice-bath and 1 ml. (0.0063 mole) of N-(2-chloro-1,1,2-trifluoroethyl)diethylamine was added. The mixture so obtained was allowed to stand overnight at approximately 5° C. and then water was added. The organic layer was separated, washed with aqueous sodium bicarbonate solution and then with water before being dried over anhydrous magnesium sulfate. The dried solution was filtered and the filtrate was evaporated to dryness. The residue (0.97 g.; M.P. 159 to 160° C.) was recrystallized from a mixture of methylene chloride and Skellysolve B. There was thus obtained 0.66 g. of 3β-fluoropregn-5-en-20-one in the form of a crystalline solid having a melting point of 166 to 170° C., undepressed by admixture with an authentic sample.

EXAMPLE 7

*11β,21-dihydroxy-16-fluoropregna - 1,4,17(20) - trien-3-one 21-acetate and 11β,21-dihydroxy-20-fluoropregna-1,4,16-trien-3-one 21-acetate*

A solution of 0.386 g. of 11β,16α,21-trihydroxypregna-1,4,17(20)-trien-3-one 21-acetate in 25 ml. of methylene chloride was cooled in an ice bath and 1 ml. of N-(2-chloro-1,1,2-trifluoroethyl)diethylamine was added. The mixture was allowed to stand for 18 hrs. at about 5° C. and then 50 ml. of water was added. The organic layer was separated and washed successively with water, aqueous sodium bicarbonate solution, and water before being dried over anhydrous magnesium sulfate. The dried solution was filtered and the filtrate was evaporated to dryness on the steam bath in a stream of nitrogen. The partly crystalline material so obtained was washed with ether and the insoluble material was isolated by filtration; 0.07 g. M.P. 173 to 175° C. (turns green on melting). The ether washings were evaporated to dryness and the residue heated at 90° C. under a pressure of 1 mm. of mercury for a short period. The residue was recrystallized from a mixture of acetone and Skellysolve B. There was thus obtained 0.15 g. of material having a melting point of 166 to 167° C. (turns green on melting). Both crystalline materials so obtained were shown by paper chromatographic analysis to be mixtures containing approximately 1 part of the 16α- and β-epimers of 11β,21-dihydroxy-16-fluoropregna-1,4,17(20)-trien-3-one 21-acetate and 2 parts of the 20α- and β-epimers of 11β,21-dihydroxy-20-fluoropregna-1,4,16-trien-3-one 21-acetate. This mixture is separated into its components by chromatography on a Florisil column using Skellysolve B containing a minor proportion of acetone as eluent.

The 11β,16α,21 - trihydroxypregna-1,4,17(20)-trien-3-one 21-acetate employed as starting material in the above reaction was prepared as follows:

A mixture of 1 kilogram of 11β,21-dihydroxypregna-1,4,17(20)-trien-3-one (U.S. Patent 2,902,410), 11.9 liters of dioxane, 3.2 liters of water and 300 g. of selenium dioxide was heated under reflux with stirring for 1 hour. The mixture so obtained was cooled and filtered and the filtrate was concentrated to about 1 liter under reduced pressure. To the concentrate was added with stirring 9 liters of absolute alcohol followed by 500 ml. of 30% hydrogen peroxide. The resulting mixture was allowed to stand at room temperature for 3 hrs. before being poured into 36 liters of water. The mixture so produced was extracted with two 10-liter portions and one 5-liter portion of methylene chloride and the combined methylene chloride extracts were washed with 3 liters of 1% aqueous sodium bisulfite solution followed by 2 liters of water. The washed solution was dried over anhydrous sodium sulfate and filtered and the filtrate was evaporated to dryness under reduced pressure. The residue was stirred with 3.5 liters of ethyl acetate and about 500 ml. of ethyl acetate was removed by distillation. The residue was allowed to cool and the solid which separated was isolated by filtration and dried. There was thus obtained 463 g. of 11β,16α,21-trihydroxypregna-1,4,17(20)-trien-3-one 21-acetate in the form of a crystalline solid having a melting point of 174 to 177° C.

EXAMPLE 8

*11β,21 - dihydroxy - 16 - fluoropregna - 1,4,17(20) - trien-3-one 21-acetate and 11β,21-dihydroxy-20-fluoropregna-1,4,16-trien-3-one 21-acetate*

A solution of 0.386 g. of 11β,20β,21-trihydroxypregna-1,4,16-trien-3-one 21-acetate in 25 ml. of methylene chloride was cooled in an ice-bath and 1 ml. of N-(2-chloro-1,1,2-trifluoroethyl)diethylamine was added. The solution was allowed to stand for 4 hrs. at 5° C. before being diluted with water. The organic layer was separated, washed with aqueous sodium bicarbonate solution and then with water, before being dried over anhydrous magnesium sulfate. The dried solution was filtered and the filtrate was evaporated to dryness, the residue being heated for a short period at 90° C. in vacuo. The residue so obtained was crystallized from a mixture of ethyl acetate, cyclohexane and acetone to give a crystalline product having a melting point of 170 to 177° C. which was shown by paper chromatographic analysis to contain a mixture of the 16α- and 16β-epimers of 11β,21-dihydroxy-16-fluoropregna-1,4,17(20)-trien-3-one 21-acetate and the 20α- and 20β-epimers of 11β,21-dihydroxy-20-fluoropregna-1,4,16-trien-3-one 21-acetate. This mixture is separated into its components by chromatography on a Florisil column using Skellysolve B containing a minor proportion of acetone as eluent.

The 11β,20,21-trihydroxypregna-1,4,16-trione-3-one 21-acetate employed as starting material in the above example is prepared as follows:

To a stirred solution of 965 mg. (0.0025 mol.) of 11β,16α,21-trihydroxy-1,4,17(20)-pregnatrien-3-one 21 - acetate prepared as described in Example 7, 100 ml. of methylene chloride and 556 mg. (0.003 mol.) of tri-n-butylamine at approximately 0° C. there was added dropwise over a 5-minute period, with continuous stirring, 393 mg. of thionyl chloride dissolved in 25 ml. of methylene chloride whilst maintaining the temperature at 0° C. The thus-obtained reaction mixture comprising the 20α- and 20β-epimeric forms of 20-chloro-11β,21-dihydroxy-1,4,16-pregnatrien-3-one 21-acetate was stirred for 1 hour at 0° C. followed by washing with three 20-ml. portions of dilute hydrochloric acid and four 50-ml. portions of water. The washed reaction mixture was then filtered and the filtrate obtained was evaporated to a volume of about 25 ml. and poured on to an 80 g. Florisil chromatographic column packed wet in Skellysolve B hexanes. The chromatographic column was developed by eluting with Skellysolve B hexanes containing increasing amounts of acetone. The eluate fractions were freed of solvent and those fractions eluted with Skellysolve B hexanes containing 9 to 12% acetone were combined. Two recrystallizations from acetone-Skellysolve B hexanes gave 700 mg. of 20α-chloro-11β,21-dihydroxy-1,4,16-pregnatrien-3-one 21-acetate having a melting point of 160–161° C., $$\lambda_{max.}^{EtOH} \ 242 \ m\mu$$

(ε 15,500) and the following analysis:

*Analysis.*—Calcd. for $C_{23}H_{29}ClO_4$: C, 68.22; H, 7.22; Cl, 8.76. Found: C, 68.17; H, 7.32; Cl, 8.88.

5.0 g. (0.0123 mole) of 20α-chloro-11β,21-dihydroxy-1,4,16-pregnatrien-3-one 21-acetate, 5.0 g. (0.039 mole) of dry silver fluoride and 500 ml. of acetonitrile were heated, under a stream of nitrogen, at reflux for 1 hour. The reaction mixture was then cooled, filtered, and the filtrate thus obtained was evaporated to dryness leaving a solid residue weighing 4.7 g. The thus obtained solid residue was dissolved in methylene chloride and poured onto a 400 g. Florisil (synthetic magnesium silicate) chromatographic column packed wet in Skellysolve B hexanes. The chromatographic column was developed by eluting with Skellysolve B hexanes containing increasing amounts of acetone. The eluatae fractions were freed of solvent and those fractions eluted with Skellysolve B hexanes containing 15% to 18% acetone were combined to yield 3.8 g. of crystalline material which was recrystallized from an ethyl acetate-Skellysolve B hexanes mixture to give an analytical sample of 11β,20β,21-trihydroxy-1,4,16-pregnatrien-3-one 21-acetate having a melting point of 194–196° C., $$\lambda_{max.}^{EtOH} \ 243 \ m\mu$$

(ε 15,600) and the following analysis:

*Analysis.*—Calcd. for $C_{23}H_{30}O_5$: C, 71.48; H, 7.82. Found: C, 71.29; H, 7.73.

EXAMPLE 9

*16β-fluoromethyl-17-isoprogesterone*

A solution of 0.69 g. of 16β-hydroxymethyl-17-isoprogesterone in 20 ml. of methylene chloride was heated under reflux with 2 ml. of N-(2-chloro-1,1,2-trifluoroethyl)diethylamine for 7 hrs. Water was added to the resulting mixture and the organic layer was separated, washed with aqueous sodium bicarbonate solution and with water, and dried over anhydrous magnesium sulfate. The dried solution was filtered and the filtrate was evaporated on a steam bath in a stream of nitrogen. There was thus obtained crude 16β-fluoromethyl-17-isoprogesterone containing 16β-hydroxymethyl-17-isoprogesterone chlorofluoroacetate as impurity. To facilitate purification, this mixture was dissolved in a mixture of 15 ml. of methanol and 0.1 g. of potassium hydroxide in 0.3 ml. of water and maintained at 25° C. for 18 hrs. in an atmosphere of nitrogen. The solution so obtained was acidified with dilute hydrochloric acid and the solid which separated was isolated by filtration, dissolved in methylene chloride and chromatographed on a column of magnesium silicate (Florisil). The column was eluted with Skellysolve B containing 10% by volume of acetone. The eluate was evaporated to dryness to give 0.32 g. of 16β-fluoromethyl-17-isoprogesterone in the form of a crystalline solid having a melting point of 167 to 169° C., not depressed by admixture with an authentic sample. The 16β-fluoromethyl-17-isoprogesterone so obtained exhibits pharmacological activity, for example, as a central nervous system depressant agent which makes it useful as a sedative when administered to mammals, including animals of economic value, and as a progestational and antiestrogenic agent.

The 16β-hydroxymethyl-17-isoprogesterone, employed as starting material in the above example, was prepared as follows:

A solution of 1.7 g. of 16β-carbomethoxy-17-isoprogesterone bisethylene ketal (prepared using the procedure described by Romo, Tetrahedron, 3, 37 (1958) who wrongly ascribed the structure 3,20-bisethylenedioxy-16α-carbomethoxy-$\Delta^5$-pregnene to this compound) in 50 ml. of tetrahydrofuran was added with stirring at 0° C. to a suspension of 3 g. of lithium aluminum hydride in 50 ml. of tetrahydrofuran. The resulting mixture was then heated under reflux for 4 hrs. before decomposing the excess lithium aluminum hydride by the successive addition of ethylacetate, ethanol, and water. The mixture so obtained was filtered through diatomaceous earth and the aqueous layer of the filtrate was extracted with ethyl acetate. The combined organic layer and extracts were washed with water and dried over anhydrous sodium sulfate. The dried solution was filtered and the filtrate was evaporated to dryness. The residual oil (1.69 g.) was chromatographed on a column of 90 g. of magnesium silicate (Florisil) made up in a mixture of equal parts of Skellysolve B and benzene. The column was eluted with benzene containing increasing proportions of ether and those fractions which, on the basis of paper chromatographic analysis, were found to contain the desired product, were combined and evaporated to dryness. The residue (0.99 g.) was crystallized from a mixture of acetone and Skellysolve B to give 0.76 g. of 16β-hydroxymethyl-17-isoprogesterone bis-ethylene ketal having a melting point of 147 to 149° C. An analytical sample having a melting point of 149 to 151° C. was obtained by further recrystallization from a mixture of acetone and Skellysolve B.

*Analysis.*—Calcd. for $C_{26}H_{40}O_5$: C, 72.19; H, 9.32. Found: C, 72.24; H, 9.42.

A solution of 2.05 g. of the 16β-hydroxymethyl-17-isoprogesterone bisethylene ketal so obtained in 100 ml. of acetone was mixed with several drops of 25% sulfuric acid and 6 ml. of water and allowed to stand overnight at room temperature. After 20 hrs. standing the solution was made alkaline by the addition of sodium bicarbonate solution and the acetone was removed by distillation under reduced pressure until crystallization began. Additional water was added and the solid which separated was isolated by filtration, washed with water, and recrystallized from a mixture of acetone and Skellysolve B. There was thus obtained 16β-hydroxymethyl-17-isoprogesterone in the form of a crystalline solid having a melting point of 190 to 192° C.

*Analysis.*—Calcd. for $C_{22}H_{32}O_3$: C, 76.70; H, 9.36. Found: C, 76.45; H, 9.47.

EXAMPLE 10

*6α-fluoromethyl-17α-hydroxy-5α-pregnane-3,20-dione 17-acetate*

A solution of 2 g. (0.0045 mole) of 6α-hydroxymethyl-3β,17α-dihydroxy-5α-pregnan-20-one 3,17-diacetate in 40 ml. of methylene chloride was refluxed with 2 ml. (0.0125 mole) of N - (2-chloro-1,1,2-trifluoroethyl)diethylamine for 7 hrs. with exclusion of atmospheric moisture. The solution so obtained was cooled and 50 ml. of ice water was added. The organic layer was separated, washed with aqueous sodium bicarbonate solution and then with water, and dried over anhydrous sodium sulfate. The dried solution was filtered and the filtrate was evaporated to dryness by heating on the steam bath in a stream of air. The residue consisted of 6α-fluoromethyl-3β,17α-dihydroxy - 5α - pregnan-20-one 3,17-diacetate contaminated with N,N-diethylchlorofluoroacetamide. This material was not purified but was treated as follows:

The above residue was dissolved in 40 ml. of methanol containing 0.5 ml. of concentrated hydrochloric acid and the mixture was heated under reflux under nitrogen for 1 hr. before being concentrated to about 20 ml. under reduced pressure and diluted to 500 ml. with ice water. The solid which separated was isolated by filtration and washed with water. There was thus obtained 6α-fluoromethyl-3β,17α-dihydroxy-5α-pregnan-20-one 17-acetate in the form of a crystalline solid. The damp material was dissolved in 100 ml. of acetone, cooled to 10° C. and treated with 1.25 ml. of a 4 N chromium trioxide-sulfuric acid-water reagent. The mixture was stirred at 10° C. to 15° C. for 15 minutes and then poured into 1 l. of water. The solid which separated was isolated by filtration, washed with water and dried in vacuo at 50° C. There was thus obtained 1.42 g. of 6α-fluoromethyl-17α-hydroxy-5α-pregnan-3,20-dione 17 acetate in the form of a crystalline solid having a melting point of 168 to 170° C.

EXAMPLE 11

*3β-fluoroandrost-5-en-17-one*

Using the procedure described in Example 3, but replacing N-(2-chloro-1,1,2-trifluoroethyl)diethylamine by N - (2-chloro-1,1,2-trifluoroethyl)diisopropylamine, there is obtained 3β-fluoroandrost-5-en-17-one in the form of a crystalline solid.

EXAMPLE 12

*3β-fluoroandrost-5-en-17-one*

Using the procedure described in Example 3, but replacing N - (2-chloro-1,1,2-trifluoroethyl)diethylamine by N-(2-chloro-1,1,2-trifluoroethyl)dibutylamine, there is obtained 3β-fluoroandrost-5-en-17-one in the form of a crystalline solid.

EXAMPLE 13

*3α-fluoro-5α-androstan-17-one*

Using the procedure described in Example 4, but replacing N-(2-chloro-1,1,2-trifluoroethyl)diethylamine by N-(2-chloro-1,1,2-trifluoroethyl)pyrrolidine, there is obtained 3α-fluoro-5α-androstan-17-one in the form of a crystalline solid.

EXAMPLE 14

*3α-fluoro-5α-androstan-17-one*

Using the procedure described in Example 4, but replacing N-(2-chloro-1,1,2-trifluoroethyl)diethylamine by N-(2-chloro-1,1,2-trifluoroethyl) - 2 - methylpyrrolidine, there is obtained 3α-fluoro-5α-androstan-17-one in the form of a crystalline solid.

EXAMPLE 15

*3α-fluoro-5α-androstan-17-one*

Using the procedure described in Example 4, but replacing N-(2-chloro-1,1,2-trifluoroethyl)diethylamine by N-(2-chloro-1,1,2-trifluoroethyl) - 2,2 - dimethylpyrrolidine, there is obtained 3α-fluoro-5α-androstan-17-one in the form of a crystalline solid.

EXAMPLE 16

*3α-fluoro-5α-androstan-17-one*

Using the procedure described in Example 4, but replacing N-(2-chloro-1,1,2-trifluoroethyl)diethylamine by N-(2,2-dichloro - 1,1 - difluoroethyl)diethylamine there is obtained 3α-fluoro-5α-androstan-17-one, in the form of a crystalline solid.

EXAMPLE 17

*3α-fluoro-5α-androstan-17-one*

Using the procedure described in Example 4, but replacing N-(2-chloro-1,1,2-trifluoroethyl)diethylamine by N-(2-chloro-1,1,2-trifluoroethyl)morpholine, there is obtained 3α-fluoro-5α-androstan-17-one in the form of a crystalline solid.

EXAMPLE 18

*3α-fluoro-5α-androstan-17-one*

Using the procedure described in Example 4, but replacing N-(2-chloro-1,1,2-trifluoroethyl)diethylamine by N-(2-chloro-1,1,2-trifluoroethyl)piperidine, there is obtained 3α-fluoro-5α-androstan-17-one in the form of a crystalline solid.

EXAMPLE 19

*3α-fluoro-5α-androstan-17-one*

Using the procedure described in Example 4, but replacing N-(2-chloro-1,1,2-trifluoroethyl)diethylamine by N-(1,1,2,2-tetrafluoroethyl)diethylamine [D. C. England et al., J. Am. Chem. Soc. 82, 5116 (1960)] there is obtained 3α-fluoro-5α-androstan-17-one in the form of a crystalline solid.

EXAMPLE 20

*3α-fluoro-5α-androstan-17-one*

Using the procedure described in Example 4, but replacing N-(2-chloro-1,1,2-trifluoroethyl)diethylamine by N-(1,1,2,3,3,3-hexafluoropropyl)diethylamine, there is obtained 3α-fluoro-5α-androstan-17-one.

EXAMPLE 21

*11β-fluoroprogesterone*

Using the procedure described in Example 3, but replacing 3β-hydroxyandrost-5-en-17-one by 11α-hydroxyprogesterone there was obtained 11β-fluoroprogesterone in the form of a crystalline solid having a melting point of 149 to 155° C.

*Analysis.*—Calcd. for $C_{21}H_{29}FO_2$: C, 75.87; H, 8.79; F, 5.72. Found: C, 76.33; H, 8.56; F, 5.18.

$\Delta^{4,9(11)}$-pregnadiene-3,20-dione was isolated as a crystalline solid having a melting point of 122 to 124° C., from the earlier fractions of eluate from the column of Florisil used to purify the above product.

The 11β-fluoroprogesterone obtained as described above exhibits pharmacological activity, for example, as a central nervous system depressant agent, useful as a sedative when administered to mammals, including animals of economic value, and as an aldosterone antagonist.

EXAMPLE 22

*15β-fluoroprogesterone*

Using the procedure described in Example 3, but replacing 3β-hydroxyandrost-5-en-17-one by 15α-hydroxyprogesterone [Helv. Chim. Acta, 41, 301 (1958)], there was obtained 15β-fluoroprogesterone in the form of a crystalline solid having a melting point of 128 to 129° C.

*Analysis.*—Calcd. for $C_{21}H_{29}FO_2$: F, 5.72. Found: F, 5.71.

The 15β-fluoroprogesterone so obtained exhibits pharmacological activity, for example, as a central nervous system depressant agent of improved therapeutic ratio, useful as a sedative when administered to mammals, including animals of economic value, and as a progestational and anti-estrogenic agent.

EXAMPLE 23

*15β-fluoropregn-4-ene-3,11,20-trione*

To a solution of 10 g. (0.029 mole) of 15α-hydroxy-11-ketoprogesterone in 260 ml. of methylene chloride was added 40 ml. of a solution of 34 g. (0.28 mole) of anhydrous triethylamine hydrofluoride in methylene chloride. The solution so obtained was cooled to 5° C. and 10 ml. of N-(2-chloro-1,1,2-trifluoroethyl)diethylamine was added. The reaction mixture was allowed to stand for 16 hrs. at about 5° C. and was then worked up using the procedure described in Example 1. After chromatography of the reaction product under the conditions described in Example 1, there was obtained 0.58 g. of pregna-4,14-diene-3,11,20-trione and 6.31 g. (63% yield) of 15β-fluoropregn-4-ene-3,11,20-trione, identical with the material obtained as described in Example 1.

EXAMPLE 24

*3α-fluoro-5α-androstan-17β-ol- and the 17β-propionate thereof*

A solution of 0.97 g. of 3α-fluoro-5α-androstan-17-one (prepared as described in Example 4) and 3 g. of lithium aluminum tri-(t.-butoxy)hydride in 20 ml. of tetrahydrofuran was allowed to stand for 16 hrs. at 25° C. To the resulting mixture was added successively 1 ml. of methanol and 40 ml. of N-hydrochloric acid and the mixture so produced was concentrated under reduced pressure to remove the organic solvents. The aqueous residue was extracted with ethyl acetate and the organic extract was dried over magnesium sulfate before being evaporated to dryness. The residue was redissolved in methylene chloride and chromatographed on a column of magnesium silicate (Florisil). The column was eluted with Skellysolve B containing 6 percent by volume of acetone and those fractions which, on the basis of infrared and papergram analysis were found to contain the desired product, were combined and evaporated to dryness. The residue was recrystallized from aqueous acetone. There was thus obtained 0.67g. of 3α-fluoro-5α-androstan-17β-ol in the form of a crystalline solid having a melting point of 143 to 146° C.

Analysis.—Calcd. for $C_{19}H_{31}FO$: C, 77.50; H, 10.61; F, 6.45. Found: C, 77.44; H, 10.50; F, 5.96.

A solution of 0.5 g. of 3α-fluoro-5α-androstan-17β-ol, obtained as described above, in 5 ml. of pyridine and 5 ml. of propionic anhydride is allowed to stand for several hours at room temperature before being poured into water. The solid which separates is isolated by filtration, washed with water, and recrystallized from aqueous methanol. There is thus obtained 3α-fluoro-5α-androstan-17β-ol 17β-propionate in the form of a crystalline solid.

Similarly, other 17β-acylates of 3α-fluoro-5α-androstan-17β-ol, such as the 17β-acetate, 17β-butyrate, 17β-cyclopentylpropionate, and the like, derived from hydrocarbon carboxylic acids containing from 1 to 12 carbon atoms, are prepared by reacting 3α-fluoro-5α-androstan-17β-ol with the appropriate acid anhydride or acid halide in the presence of a tertiary base such as pyridine.

The above-described compound 3α-fluoro-5α-androstan-17β-ol and the 17β-acylates thereof exhibit pharmacological activity and are useful as anabolic-androgenic agents, cholesterol-lowering agents, antifertility agents and central nervous system depressant for which purposes they can be administered to mammals, including animals of economic value, using the dosage forms commonly employed in the art.

EXAMPLE 25

*3α-fluoro-17α-methyl-5α-androstan-17β-ol and the 17β-propionate thereof*

To a solution of 1 g. of 3α-fluoro-5α-androstan-17-one (prepared as described in Example 4) in 40 ml. of a mixture of equal parts of benzene and ether is added dropwise, with stirring, a total of 10 ml. of ethereal 3 M methylmagnesium bromide and the resulting mixture is stirred at approximately 25° C. for 20 hrs. At the end of this period 3 ml. of saturated aqueous ammonium chloride is added and the reaction mixture is filtered. The filtrate is dried over anhydrous magnesium sulfate and evaporated to dryness. The residue is dissolved in a small quantity of methylene chloride and the resulting solution is chromatographed on a column of magnesium silicate (Florisil). The column is eluted with Skellysolve B containing increasing proportions of acetone and those fractions which, on the basis of infrared and paper chromatographic analysis, are found to contain the desired product are combined and evaporated to dryness. The residue is recrystallized from aqueous methanol. There is thus obtained 3α-fluoro-17α-methyl-5α-androstan-17β-ol in the form of a crystalline solid.

A solution of 0.5 g. of 3α-fluoro-17α-methyl-5α-androstan-17β-ol, obtained as described above, in 5 ml. of pyridine and 5 ml. of propionic anhydride is allowed to stand for several hours at room temperature before being poured into water. The solid which separates is isolated by filtration, washed with water, and recrystallized from aqueous methanol. There is thus obtained 3α-fluoro-17α-methyl-5α-androstan-17β-ol 17β-propionate in the form of a crystalline solid.

Similarly, other 17β-acylates of 3α-fluoro-17α-methyl-5α-androstan-17β-ol, such as the 17β-acetate, 17β-butyrate, 17β-cyclopentylpropionate, and the like, derived from hydrocarbon carboxylic acids containing from 1 to 12 carbon atoms, are prepared by reacting 3α-fluoro-17α-methyl-5α-androstan-17β-ol with the appropriate acid anhydride or acid halide in the presence of a tertiary base such as pyridine.

The above-described 3α-fluoro-17α-methyl-5α-androstan-17β-ol and the 17β-acylates are active as anabolic agents and can be administered to mammals, including valuable domestic animals using the routes of administration and dosage forms commonly employed in the art for this purpose.

I claim:
1. A compound having the formula:

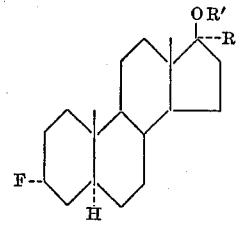

wherein R is methyl and R' is selected from the class consisting of hydrogen and the acyl radical of aliphatic and cycloaliphatic carboxylic acids containing from 1 to 12 carbon atoms, inclusive.
2. 3α-fluoro-17α-methyl-5α-androstan-17β-ol.
3. 15β-fluoroprogesterone.
4. 3α-fluoro-5α-androstan-17-one.

References Cited by the Examiner
UNITED STATES PATENTS
3,009,927  11/61  Reimann et al. _____ 260—397.4

OTHER REFERENCES
Fieser et al.: "Steroids" (1959), Reinhold Publishing Corporation, F44, page 541.
Syndor: "Endocrinology," vol. 62 (1958), page 322.

LEWIS GOTTS, *Primary Examiner.*